Sept. 26, 1972 M. NICHOLS 3,694,295
MACHINE FOR SEALING PRINTED CARDS TO FILLED BLISTER CARDS
Filed Nov. 23, 1970 5 Sheets-Sheet 1

INVENTOR.
MATTHEW NICHOLS
BY
Louis Necho
ATTORNEY.

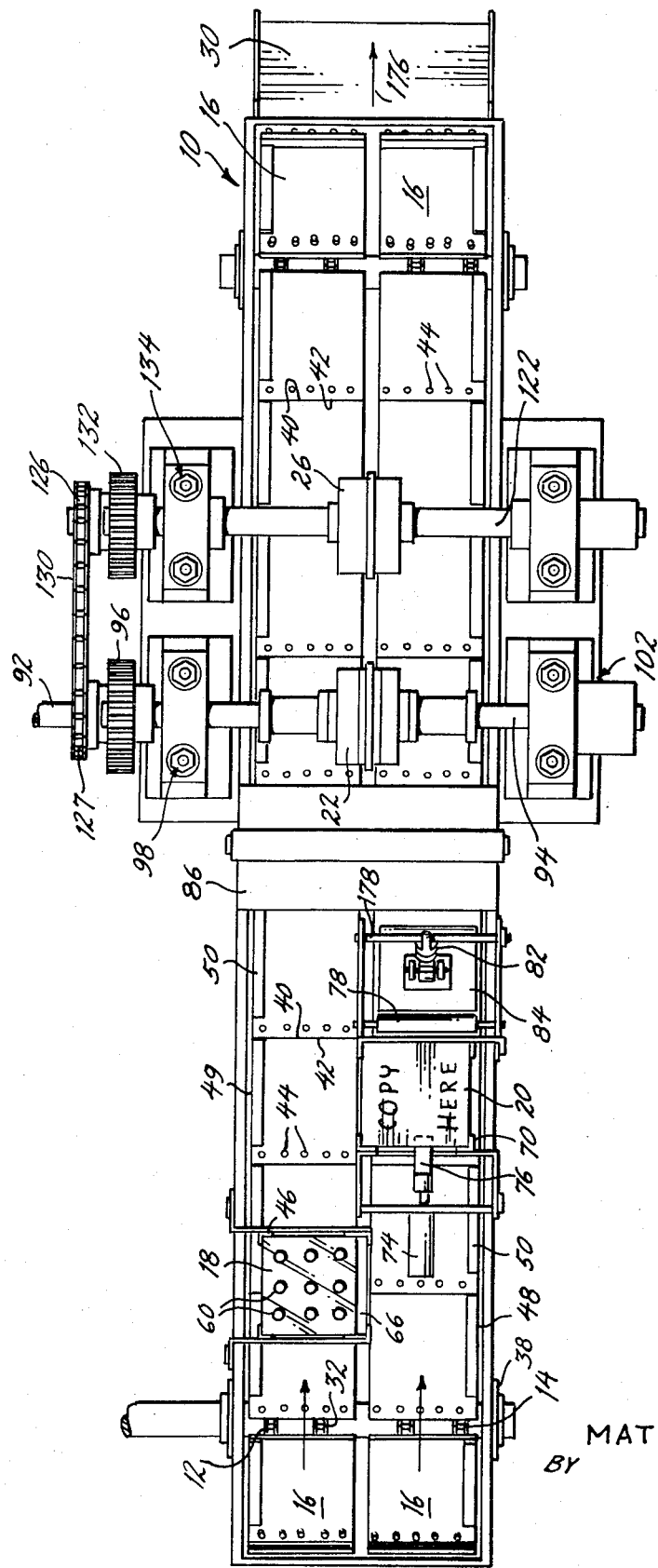

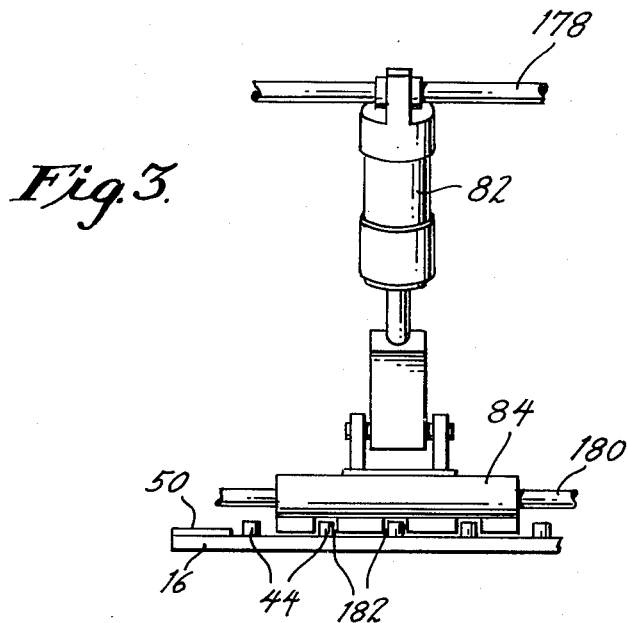
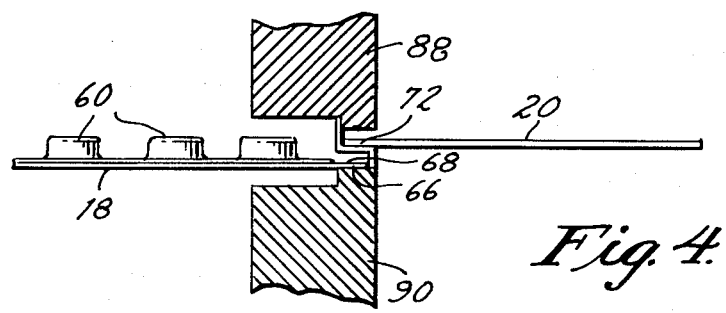
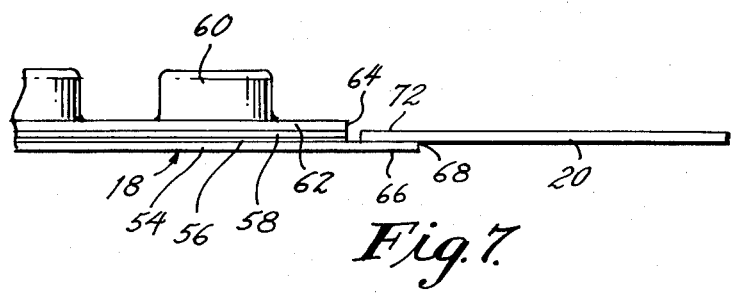

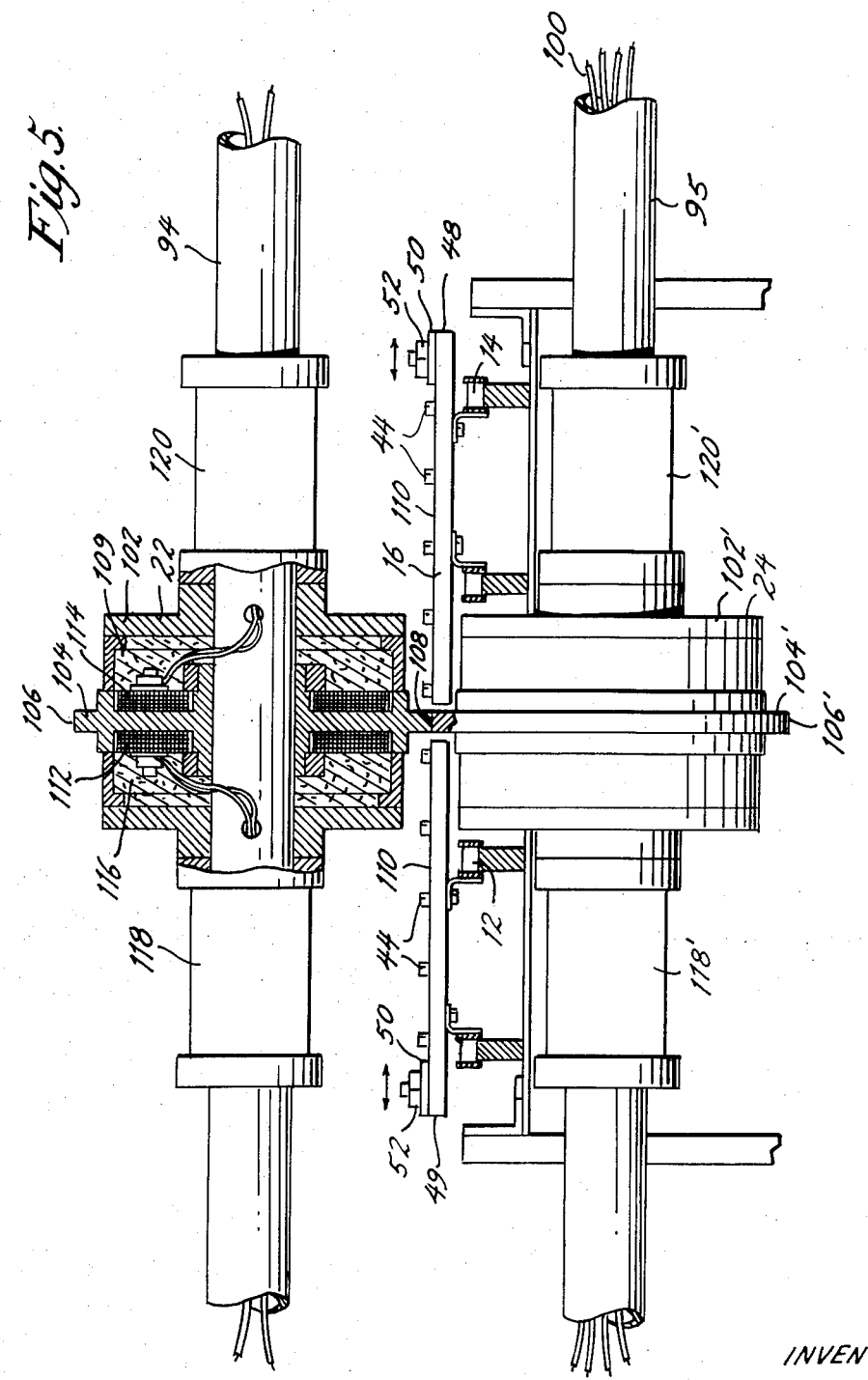

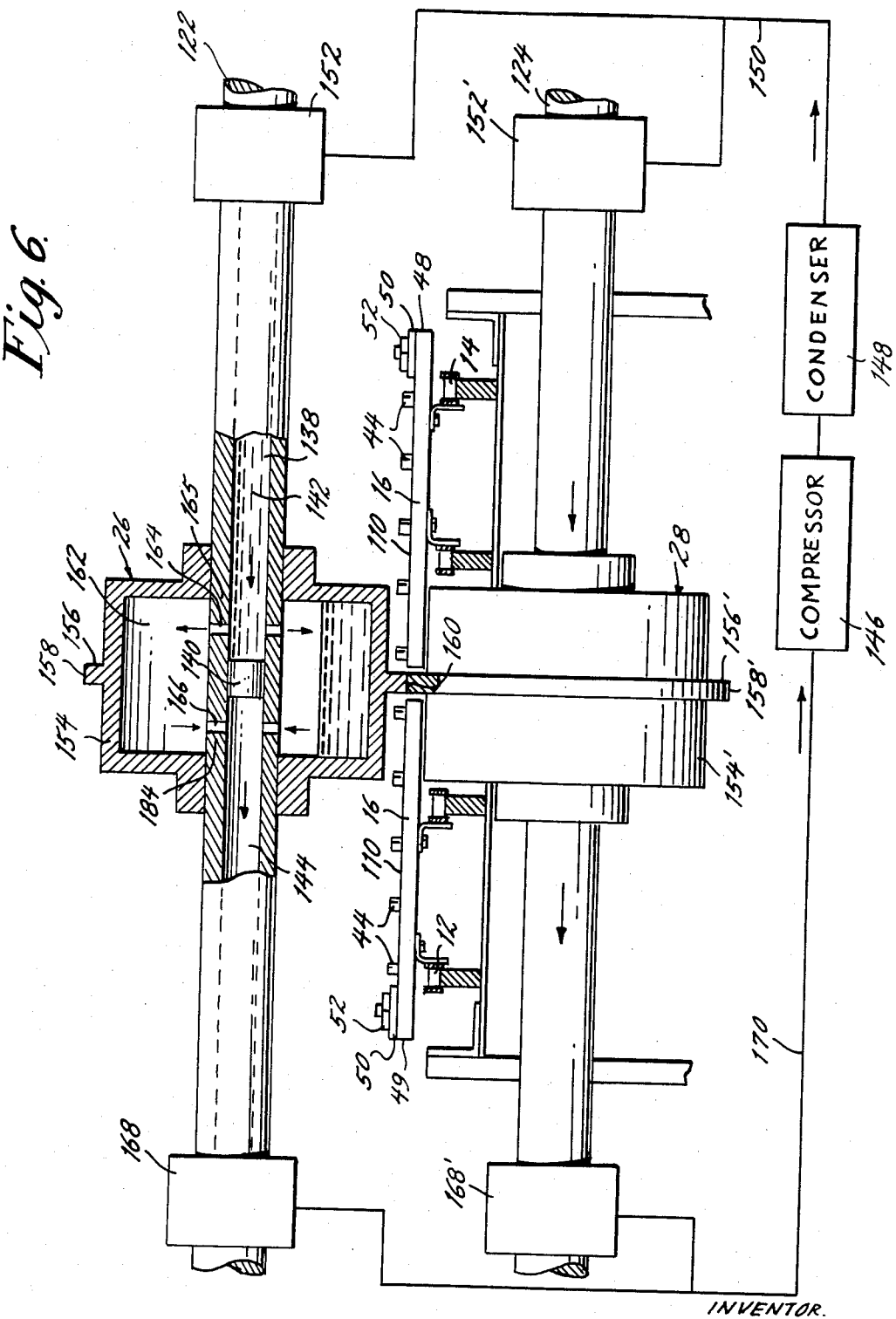

United States Patent Office 3,694,295
Patented Sept. 26, 1972

3,694,295
MACHINE FOR SEALING PRINTED CARDS TO FILLED BLISTER CARDS
Mathew Nichols, Norristown, Pa., assignor to Sauter Packaging Company, Souderton, Pa.
Filed Nov. 23, 1970, Ser. No. 92,112
Int. Cl. B65h 29/00
U.S. Cl. 156—556      18 Claims

ABSTRACT OF THE DISCLOSURE

A machine for sealing printed cards to previously filled blister type medicinal tablet containing packages, including a pair of synchronized, horizontally juxtaposed conveyors, one for transporting blister cards and the other for printed cards. Each conveyor carriers a plurality of plates which are equipped at the trailing edges thereof with a plurality of projections which contact the rear of each respective card to propel it forwardly. Each conveyor plate is further equipped with adjustable side guides to precisely position the overlapping portions of the printed and blister cards for sealing purposes. The printed card conveyor includes pusher means to urge the printed cards into contact with the conveyor plate projections. A heater block station receives the synchronized blister and printed cards and pre-heats the previously overlapped marginal areas. Rotary heated rollers receive the pre-heated cards from the heater block station for heat sealing and then feed the cards to a pair of refrigerated rollers which affix the adhesive and deliver the affixed cards to a delivery chute.

BACKGROUND OF THE INVENTION

The present invention relates to the general field of medicinal tablet packaging, and more particularly, is directed to an apparatus for rapidly producing a plurality of medicinal tablet-containing packages in finished form, each having an affixed, information-containing card.

In the production and manufacture of medicinal tablet-containing packages, it has become increasingly important to provide printed material with the tablet package to completely describe the contents of the packaged medicinals. In order to facilitate production, the use of information-containing printed cards has become quite common. The printed cards also provide auxiliary information, such as recommended usage, dosage, warnings, and similar information. In the case of small medicinal tablet containers, the lack of space on the package, itself, has resulted in the necessity of providing an auxiliary card which contains all of the desired information. The manufacture, printing, handling and attaching of such auxiliary cards in the medicinal tablet-packaging industry has resulted in greatly increased manufacturing costs, and with reduced production because of the manual operations required thereby. Prior workers in the art have attempted to develop equipment and machinery which are completely automated, thereby to eliminate hand operations but, to date, attempts to produce such automatic, rapid and synchronized machinery have consistently met with failure. Accordingly, to a large extent, many manual operations are still required in the industry to affix printed cards to the tablet-containing packages.

SUMMARY OF THE INVENTION

The present invention relates generally to an automatic machine capable of receiving a stack of previously filled medicinal tablet-containing blister packages which are fabricated with an overhanging glued flap, and a stack of previously printed supplemental information-bearing cards, and respectively affixing a printed card to each blister package in an automatic, synchronized, rapid and continuous manner. Apparatus for producing blister packages of the type set forth has been completely disclosed and described in my co-pending application entitled: "Method of Fabricating Blister Type Medicinal Tablet Containers," Ser. No. 37,251 filed May 14, 1970, now abandoned.

The present invention includes an apparatus equipped with a pair of synchronized, horizontally juxtaposed chain conveyors, each carrying a plurality of spaced conveyor plates. Each conveyor plate is provided with adjustable side guides to overlap marginal portions of the respective medicinal tablet cards and printed cards. Each plate additionally carriers a plurality of projections at the trailing edges thereof, which transversely align to push the respective cards through the apparatus in synchronized relationship. A hopper for blister cards overlies one of the chain conveyors and feeds one blister card on to each conveyor plate with the previously glued tab projecting into the overlapping area for registry with a printed card. A printed card hopper overlies the second chain conveyor and feeds printed cards through pivoted pusher-means to the conveyor plates. One edge of the printed card overlaps the glued tab of the associated blister card in a manner to provide completely automatic, rapid and positive adhesion of the respective tablet-containing cards and printed cards.

It is therefore an object of this invention to provide an improved machine for sealing printed cards to previously filled blister cards.

It is another object of the present invention to provide a novel sealing machine capable of synchronizing and registering horizontally juxtaposed cards, and then continuously and automatically sealing them along overlapping marginal areas.

It is a further object of the present invention to provide a novel machine for sealing printed cards to previously filled blister cards which employs a pair of chain conveyors—each carrying a plurality of conveyor plates—each conveyor plate being equipped at the trailing edge thereof with transversely aligned, card-propelling projections.

It is another object of the present invention to provide a novel machine for sealing printed cards to previously filled blister cards which includes rotary heated and refrigerated rollers; and which is capable of continuous operation with previously pre-heated and glued printed cards and filled blister cards.

It is another object of the present invention to provide a novel machine for sealing printed cards to previously filled blister cards that is automatic in operation, rapid in production, and trouble-free when in use.

Other objects and a fuller understanding of the invention will be had by referring to the following description and claims of a preferred embodiment thereof, taken in conjunction with the accompanying drawings wherein like reference characters refer to similar parts throughout the several views.

IN THE DRAWINGS

FIG. 2 is a top plan view taken along line 2—2 of FIG. 1, looking in the direction of the arrows, with some parts omitted for the sake of clarity.

FIG. 3 is an enlarged, cross-sectional view taken along line 3—3 of FIG. 1, looking in the direction of the arrows.

FIG. 4 is an enlarged, fragmentary view taken along line 4—4 of FIG. 1, looking in the direction of the arrows.

FIG. 5 is an enlarged, cross-sectional view taken along line 5—5 of FIG. 1, showing the upper roller in section and the lower roller in elevation.

FIG. 6 is an enlarged, cross-sectional view taken along line 6—6 of FIG. 1, showing the upper roller in section and the lower roller in elevation.

FIG. 7 is an enlarged, fragmentary view of the overlapped area of the two cards.

DESCRIPTION OF THE PREFERRED EMBODIMENT OF THE INVENTION

Figure 1:
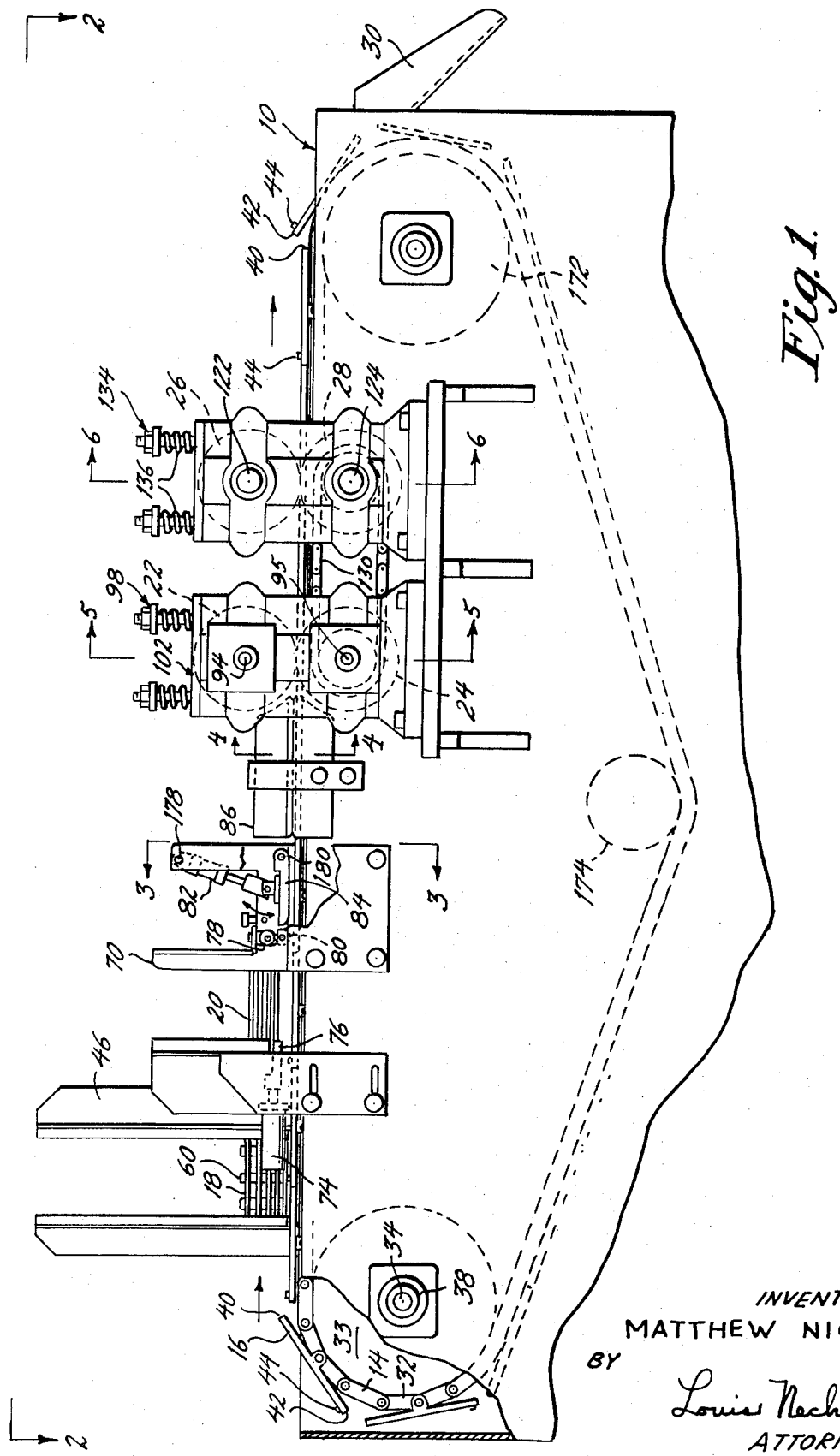
FIG. 1 is a side elevational view of the machine, partially broken away to expose the interior construction.

Although specific terms are used in the following description for the sake of clarity, these terms are intended to refer only to the particular structure of my invention selected for illustration in the drawings, and are not intended to define or limit the scope of the invention.

Referring now to the drawings, I show in FIGS. 1 and 2 an apparatus 10 for sealing printed cards to previously medicinal-tablet-filled blister cards. The machine includes a pair of horizontally juxtaposed chain conveyors 12, 14, each of which carries a plurality of conveyor plates 16 for propelling the blister cards 18, and printed cards 20, forwardly through the machine for sealing purposes as hereinafter more fully set forth. The chain conveyors 12, 14, travel in unison and synchronize the forward motion of the blister cards 18 and printed cards 20, by synchronizing the travel of the conveyor plates 16. The cards 18, 20, position upon horizontally aligned pairs of conveyor plates 16 in a manner to place one common edge in overlapping relation for heat sealing at the rotary heating section 102. The conveyors 12, 14, carry the synchronized and overlapping blister and printed cards 18, 20, from the preheater section 86 through the heated rollers 22, 24, and then through the refrigerated rollers 26, 28, wherein the sealed junction between the blister and printed cards 18, 20, is positively set in a permanent manner. Following the operation at the refrigerated rollers 26, 28, the conveyor plates 16 urge the combined cards forwardly through the machine 10 for exit at the delivery chute 30.

Each chain conveyor 12, 14, comprises a pair of endless link chains 32, which are simultaneously driven by sprockets 33 which affix to the shaft 34 in well-known manner, to assure that all of the endless link chains 32 travel at precisely the same velocity. The shaft 34 journals through the machine sidewalls and rotates within the right and left bearings 36, 38, under impetus of rotative power supplied by an external power source (not shown). The chains 32 rotate about the driven sprockets 172, through the idler sprockets 174 in well-known manner, to facilitate tensioning and other usual belt adjusting functions. The plates 16 bolt or otherwise affix to the chain conveyors 12, 14, and space from each other a distance just sufficient to permit the leading edge 40 of each plate 16 to clear the trailing edge 42 of the next forwardly positioned plate, thereby to provide a pair of substantially solid horizontally juxtaposed moving conveyor platforms (see FIG. 2). Pairs of plates 16 affix to the chain conveyors 12, 14, in transverse alignment to synchronize their travel through the machine 10. The respective pairs of plates transversely align during all periods of operation to precisely transversely align and register blister cards 18, and printed cards 20, during their path through the machine as hereinafter more fully set forth. Each plate 16 is equipped with a plurality of transversely aligned projections 44 for card-pushing purposes. The projections 44 position immediately forwardly of the trailing edge 42 of each conveyor plate 16, to provide a convenient method for urging the cards 18, 20, forwardly through the machine in aligned relation. The respective outboard edges 48, 49, of each conveyor plate 16 are each provided with an adjustable side guide 50 for positioning the cards 18, 20, to precisely register the mating edges of the moving blister cards 18 and printed cards 20 as they progress through the machine 10 for sealing, as hereinafter more fully set forth. Transverse, elongated slots (not shown), and threaded bolts 52 may be employed in the usual manner to furnish the necessary degree of transverse adjustment to the side guides 50 to position the cards for edge-overlapping purposes. See FIGS. 2, 5, and 6.

A blister card hopper 46 overlies the chain conveyor 12 in position to guide individual blister cards 18 on to the chain conveyor 12 as the conveyor plates longitudinally move forwardly through the machine. As best seen in FIG. 7, each blister card 18 comprises a lamina of a bottom cardboard layer 54, a foil layer 56 applied to the cardboard layer 54, a thermoplastic layer 58, and a top cardboard layer 62. The thermoplastic layer is pre-formed to form a plurality of blisters 60 and the layer of cardboard 62 applies directly to the thermoplastic layer 58 over the formed blisters 60 to provide a relatively rigid, firm package, for containing medicinal tablets, (not shown). The top cardboard layer 62, the thermoplastic layer 58, and the foil layer 56, terminate laterally inwardly in the same vertical plane 64. The bottom cardboard layer 54 extends transversely beyond the plane 64 to form an extended tab 66, one surface of which has previously been treated with a heat sensitive adhesive 68 for securing to the printed card 20, as hereinafter more fully described, and as described in the aforesaid copending patent application. The blister cards 18 feed into the blister card hopper 46 with the projecting blisters 60 facing upwardly, and with the tabs 66 extending transversely inwardly and overlaying the longitudinal axis 176 of the machine 10. The blisters 60 serve to vertically space the individual blister cards 18 as best seen in FIG. 1, to facilitate individual engagement with the projections 44 of the moving conveyor plates 16. The hopper 46 positions the blister cards 18 in vertical registry over the plates 16 as they are propelled by the chain conveyor 12. As each plate 16 passes beneath the hopper 46, the projections 44 of each succeeding conveyor plate 16 engage the trailing edge of the bottom-most blister card 18 thereby to propel each card individually forwardly through the machine, one card being propelled by each succeeding plate 16.

A printed card hopper 70 is affixed to the machine in a manner to position a stack of cards 20 above the chain conveyor 14. The printed cards are dispensed from the bottom of the hopper onto plates 16 which are part of the conveyor 14 for longitudinal travel through the machine. The cards carried by plates 16 are so located as to align the edge portions 72 thereof with glued tab 66 of the corresponding blister card 18. A first hydraulic cylinder system 74 reciprocates bottom finger means 76 to push said card into the nip of pinch rolls 78, 80, in timed sequence with the movement of the chain conveyor plates 16.

A second hydraulic system 82 functions in conjunction with the first hydraulic system 74, and is provided with a bottom flat plate 84 for printed-card directing purposes. The system pivots about the hopper pivot 178 and has pivotal motion from an initial, card-receiving position, (not shown), to a final card-pushing position as illustrated in FIG. 1. As each successive printed card 20 passes the pinch rolls 78, 80, the flat plate 84 pivots about the machine-affixed pin 180 to the card-receiving position, wherein the trailing edge of the flat plate 84 raises, to guide each printed card in turn downwardly toward each succeeding conveyor plate 16. Mechanical or electrical control systems (not shown), time the operation of the first and second hydraulic systems in well-known manner to place one printed card 20 upon each passing conveyor plate 16. As each sucessive card clears the nip of the pinch rolls 78, 80, the second hydraulic cylinder system 82 functions to pivot the trailing edge of the flat plate 84 downwardly to the horizontal position as indicated in FIG. 1, to push each successive printed card into intimate contact with the next traveling conveyor plate 16. As best seen in FIG. 3, the plate 84 is bottomly machined to provide a plurality of bottom grooves 182 which longitudinally align with the projections 44 to permit continuous operation of the conveyor 14 by allowing the moving projections 44 to travel through the grooves 182 when the flat plate pivots to the horizontal position.

Under presure applied by the flat plate 84, each printed card 20 is urged to contact the top of each plate 16. The rearwardly positioned projections 44 then contact the trailing edge of each card to move it forwardly along the chain conveyor 14 in precisely spaced relationship, and in precise alignment with the latterally positioned, co-operating blister cards 18. The blister cards 18 are simultaneously urged forwardly through the machine 10 by the conveyor 12 which synchronizes with the conveyor 14 through the action of the driving shaft 34 and the shaft affixed sprockets 33. Thus, the respective blister cards 18 and printed cards 20 are urged simultaneously forwardly through the machine 10 by the transversely positioned pairs of conveyor plates 16, which affix to the laterally positioned conveyors 12, 14, with the respective glued tab 56 of each blister card and the overlap edge 72 of each printed card, in precise vertical alignment.

With the respective glued tab 56 and the overlap edge 72 of each succeeding blister cards 18 and the printed cards 20 thus registered, the chain conveyors 12, 14, transport the cards forwardly through the machine 10 to the pre-heater section 86. The pre-heater section 86 aligns over the longitudinal machine axis 176, and includes upper and lower heater blocks 88, 90. The heater blocks 88, 90, may be electrically heated in well-known manner to initially activate the heat sensitive adhesive 68 which had been previously applied to the tab 66 of the blister card 18. (See FIG. 4). As best seen in FIGS. 1 and 2, the registered and paired cards 18, 20, with the adhesive 86 preliminary melted at the pre-heater section 86, push forwardly under urging of the projections 44 to the nip of the upper and lower heated rollers 22, 24. A drive shaft 92 extends from the upper roller shaft 94, and may receive its power in well-known manner from the drive shaft 34, thereby to synchronize movement of the conveyor chains 12, 14, and the heated rollers 22, 24. The shaft affixed drive gear 96 serves to drive the lower roller shaft 95 in synchronism with the upper shaft 94 to assure simultaneous operation of the upper and lower heated rollers 22, 24. Upper spring-biased pressure adjusting means 98, urge the upper heated roller 22 into positive, pressuriped contact with the lower heated roller 24, for card-sealing aaction.

As best seen in FIG. 5, the upper and lower heated roller shafts 94, 95, provide a conduit for the electrical wires 100 which feed electrical current to the upper and lower rotary co-operating heating sections 102, 102'. Each heating section 102, 102', incorporates a circular heating disc 104, 104', which tangentially rotatively press together under the bias of the upper pressure adjusting means 98, to squeeze the previously registered and overlapped card overlap edge 72 and the blister card glued tab 66 together for positive sealing, in accordance with well-known heat sealing techniques. The respective heating disc peripheral heating areas 106, 106', respectively align over the longitudinal machine axis 176, and touch at the pressurized heat sealing area 108, which precisely vertically aligns with the top surfaces 110 of the transversely positioned pairs of the conveyor plates 16. Thus, as the cards 18, 20, urge forwardly through the machine under impetus of the projections 44 of the respective conveyor plates 16, in transverse registry by the synchronized chain conveyors 12, 14, the respective cards feed directly through the heated rollers 22, 24, where they are pressed together and additionally heated at the heat sealing area 108. Each heating section 102, 102', defines an annular area 109 wherein a pair of ring shaped heaters 112, 114, intimately contact the circular heating discs 104, 104', to heat the peripheral heating areas 106, 106', through conduction. The upper and lower roller heating wires 100, 100', energize the ring shaped heaters 112, 114, in well-known manner to provide adequate heat for heat-sealing purposes. The remaining space of the annular area may be packed with an insulating material such as asbestos 116, to provide an efficiently operating heating unit. If desired, the lateral areas 118, 118', and 120, 120', which space on either side of the rotary heating sections 102, 102', may be provided with cooling means such as a plurality of circular fins (not shown), to more rapidly dissipate the unused heat of the heated rollers 22, 24.

Following the heat-sealing operation, the affixed cards 18, 20, feed into the nip of the upper and lower refrigerated rollers 26, 28, as best seen in FIGS. 1 and 2. The upper and lower refrigerated rollers 26, 28, turn upon respective upper and lower shafts 122, 124, which journal within the sides of the machine 10, in well-known manner, for rotary operation. The upper shaft 122 carries a driven sprocket 126 at one end thereof, which co-operates with the upper heated roller drive shaft driving sprocket 127 by means of the drive chain 130, to synchronize operation of the refrigerated rollers 26, 28 with the heated rollers 22, 24. A driving gear 132 pins or otherwise affixes to the upper shaft 122, and transmits power from the upper shaft 122 to the lower shaft 124 in the usual manner to provide synchronized upper and lower refrigerated roller operation. Upper pressure adjusting means 134 include a plurality of compression springs 136, and serve to bias the upper refrigerated roller 26 downwardly into pressurized contact with the lower refrigerated roller 28 for adhesive fixing purposes, as hereinafter more fully set forth.

Referring now to FIG. 6, the refrigerated rollers 26, 28, are illustrated having the respective shafts 122, 124, provided with transverse refrigeration conduits 138, which function to provide a portion of the refrigerant piping system for cooling purposes. A medially positioned plug 140 divides the refrigeration conduit 138 and separates the liquid refrigerant section 142 from the gaseous refrigerant section 144. Refrigerant gas is compressed at the compressor 146 and then feeds to the condenser 148 where it is cooled to the liquid state in accordance with well-known refrigeration principles. The liquid refrigerant under pressure from the compressor flows through the refrigerant piping 150 to the rotating unions 152, 152', which affix near one lateral end of the respective upper and lower shafts 122, 124, in a manner to introduce the liquid refrigerant into the refrigeration conduit 138 in a leak-proof rotating connection. Thus, the liquid refrigeration section 142 may be readily charged with liquid refrigerant from the rotating unions 152, 152', to the centrally positioned plugs 140.

Each of the upper and lower refrigerated rollers 26, 28, incorporates a medially positioned, rotary refrigeration section 154, 154', which include a circular centrally positioned refrigeration ring 156, 156', in alignment with the longitudinal axis 176. The peripheral areas 158, 158', tangentially engage at the pressurized cooling area 160 to squeeze the previously registered and heat-sealed tab 66 and edge 72 of each blister and printed cards 18, 20, to rapidly cool the adhesive 68 to assure positive adhesion of the cards 18, 20. The upper pressure adjusting means 134, serve to adequately pressurize the heat-sealed area at all times for the necessary cooling purposes. The pressurized cooling area 160 vertically aligns with the top 110 of the conveyor plates 16, and horizontally aligns with the longitudinal machine axis 176, thereby to receive the previously registered and aligned cards 18, 20, as they are urged through the machine 10 by means of the plate carried projections 44.

Each rotary refrigeration section 154, 154', defines an annular, hollow expansion area 162, wherein the liquid refrigerant expands to the gaseous state. One or more expansion valves 164 position through the conduit wall 165, and rotate as the shafts 122, 124, rotate. The refrigeration effect produced by the change in state from a liquid refrigerant in the liquid refrigeration section 142 to the gaseous state in the expansion area 162 serves to cool the entire rotary refrigeration section 154, 154', and especially the refrigeration rings 156, 156'. The cooling effect of the expansion of the refrigerant is thus impressed at the respective peripheral areas 158, 158', to speedily cool the adhesive 68 as the previously registered cards 18, 20, pass the pressurized cooling area 160. The gaseous refrigerant exits the expansion area 162 through one or more exhaust ports 166, which position through the walls 184 of the section 144 on the gaseous refrigeration section side of the central plug 140. The exhaust refrigerant gas exits the gaseous refrigerant section 144 through the rotary unions 168, 168', which serve to direct the exhaust gas to the refrigerant return piping 170 in a leak-proof, rotating junction. The return piping 170 feeds the suction of the compressor 146 in the usual manner to complete the refrigeration cycle.

After the heat-sealing and cooling operations at the respective heated rollers 22, 24, and refrigerated rollers 26, 28, are completed, the firmly affixed blister and printed cards 18, 20, continue through the machine under urging of the respective conveyor plates 16 and the affixed projections 44 for exit through the delivery chute 30.

What I claim is:

1. In a machine for sealing adjacent blister cards and printed cards at one overlapping edge thereof, wherein a heat sensitive adhesive is applied to the overlapping edge, the combination of:
   (A) conveyor means having a portion thereof travelling horizontally through the machine,
   a plurality of conveyor plates being affixed to the conveyor means for carrying the blister cards and printed cards through the machine,
   said conveyor plates being arranged in horizontally juxtaposed pairs,
   said pairs of plates being transversely aligned,
      (1) said conveyor plates including overlap means to overlap an edge portion of one said blister card with an edge portion of one said printed card;
   (B) blister card hopper means individually feeding blister cards onto one of each said pair of conveyor plates;
   (C) printed card feeding means directing printed cards onto the second of each said pair of conveyor plates;
   (D) synchronizing means transversely aligning each said blister card with a printed card as the cards travel along the conveyor means; and
   (E) rotary heating means heating the said overlapping edge portions of the cards.

2. The invention of claim 1 and refrigeration means cooling the said overlapping edge portions to rapidly affix the previously heated adhesive.

3. The invention of claim 1 wherein the synchronizing means include a plurality of transverse projections, associated with each conveyor plate, the said projections serving to push the respective cards through the machine.

4. The invention of claim 1 wherein the said overlap means includes adjustable side guides for adjusting the lateral position of the said cards, the said guides serving to assure that an edge portion of each printed card overlies an edge portion of one blister card.

5. The invention of claim 1 wherein the printed card feeding means include a first hydraulic cylinder system, said system including a bottom finger to push the bottommost card from the printed card hopper in synchronization with the movement of the said conveyor plates.

6. The invention of claim 5 and a second hydraulic cylinder system, said second hydraulic cylinder system including a bottom flate plate for pushing each printed card respectively upon a conveyor plate.

7. The invention of claim 6 wherein the said bottom flat plate pivotally connects to the said machine and has pivotal motion with respect to the said conveyor plates.

8. The invention of claim 7 wherein the bottom plate pivots rearwardly upwardly to receive each successive printed card from the first hydraulic cylinder system and then pivots downwardly to urge the card onto each respective conveyor plate.

9. The invention of claim 6 wherein the said flat bottom plate is provided with a plurality of bottom longitudinal grooves to receive portions of the said synchronizing means in passing relation.

10. The invention of claim 2 wherein the rotary heating means, the refrigeration means, and the conveyor means are provided with means for synchronization of operation.

11. The invention of claim 1 wherein the heating means include centrally positioned, upper and lower rotary heating sections, each heating section having a circular heating disc, the said upper and lower heating discs vertically aligning respectively above and below the overlapping edges of the said printed cards and blister cards thereby to heat the overlapping area as the cards pass through the heating means.

12. The invention of claim 11 wherein the upper heating section is provided with pressure means to press the upper circular heating disc into pressurized, circular contact with the lower heating disc.

13. The invention of claim 2 wherein the refrigeration means include a hollow shaft, the said shaft being divided into a liquid refrigeration section and a gaseous refrigeration section.

14. The invention of claim 13 wherein the said hollow shaft is provided at the lateral ends thereof with rotating unions, the said unions forming rotating, leak-proof junctions to permit entrance and exit of refrigerant with respect to the shaft.

15. The invention of claim 13 wherein a refrigerant expansion valve mounts within the shaft and rotates with the shaft.

16. The invention of claim 2 wherein the refrigeration means include centrally positioned, upper and lower rotary refrigeration sections, each refrigeration section having a circular refrigeration ring, the said upper and lower refrigeration rings vertically aligning respectively above and below the overlapping edges of the said blister and printed cards to thereby cool the overlapping area as the cards pass through the refrigeration means.

17. The invention of claim 16 and a hollow shaft rotating the said refrigeration means.

18. The invention of claim 17 and a refrigerant expansion valve mounted upon the said shaft, the said valve expanding refrigerant from the shaft into a rotary refrigeration section.

References Cited

UNITED STATES PATENTS

| 2,503,984 | 4/1950 | Werko | 156—571 X |
| 2,379,361 | 6/1945 | Bombard | 156—571 X |
| 3,562,071 | 2/1971 | Rockefeller | 156—566 |
| 3,547,013 | 12/1970 | Gentry et al. | 156—566 X |

RALPH S. KENDALL, Primary Examiner

C. WESTON, Assistant Examiner

U.S. Cl. X.R.

156—498, 538, 539, 557, 566, 571